United States Patent [19]

Brandner et al.

[11] Patent Number: 4,739,929

[45] Date of Patent: Apr. 26, 1988

[54] FUEL INJECTION VALVE

[75] Inventors: Burkhard Brandner, Werdohl; Dieter Graef, Lüdenscheid; Klaus Wenzlik, Iserlohn, all of Fed. Rep. of Germany

[73] Assignee: Atlas Fahrzeugtechnik GmbH, Werdohl, Fed. Rep. of Germany

[21] Appl. No.: 905,517

[22] Filed: Sep. 9, 1986

[51] Int. Cl.⁴ ........................ B05B 3/14; F16K 31/02; F02M 51/06

[52] U.S. Cl. .............................. 239/102.2; 239/397.5; 310/365; 310/369

[58] Field of Search ..................... 239/4, 397.5, 102.2; 310/324, 325, 328, 334, 364, 365, 366, 369

[56] References Cited

U.S. PATENT DOCUMENTS 3,390,287 6/1968 Sonderegger ........................ 310/369
4,471,256 9/1984 Igashira et al. ...................... 310/328
4,579,283 4/1986 Igashira et al. .................. 239/102.2
4,629,928 12/1986 Hamada et al. ...................... 310/365
4,631,436 12/1986 Edinger et al. ...................... 310/324
4,635,849 1/1987 Igashira et al. .................. 239/102.2

FOREIGN PATENT DOCUMENTS 1751543 8/1970 Fed. Rep. of Germany ... 239/102.2
1410312 10/1975 United Kingdom ............. 239/102.2

*Primary Examiner*—George E. A. Halvosa
*Assistant Examiner*—Karen B. Merritt
*Attorney, Agent, or Firm*—Peter K. Kontler

[57] ABSTRACT

A fuel injection valve having a piezoceramic valve body, comprising a plurality of superposed ceramic plates each having one conductor layer on each side and voltage leads to the conductor layers. Each ceramic plate is arranged on a carrier plate. Between each unit, consisting of a ceramic plate and a carrier plate, an insulating foil is provided with conductor foils arranged on each side as conductor layers. Each insulating foil comprises two terminal lugs. Each insulating foil, in the region of a terminal lug, is laminated on one side with one conductor foil. The correlated termial lugs are connected in each case to an electrical contact for the correlated conductor foils.

5 Claims, 3 Drawing Sheets

Fig.1
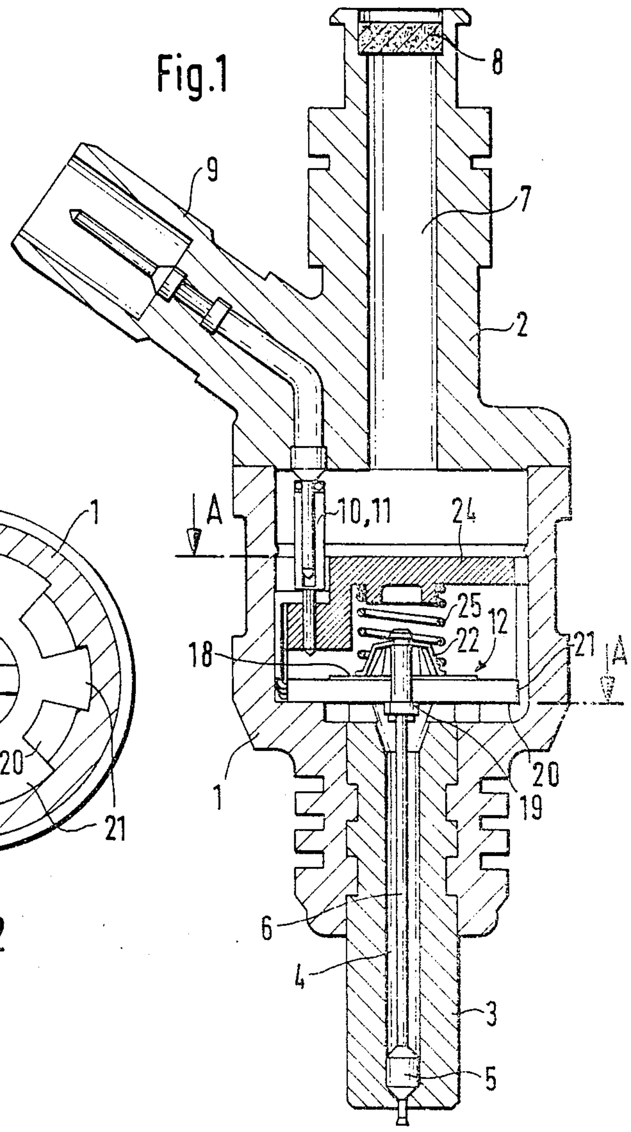
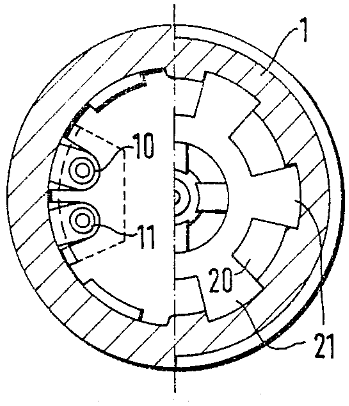
Fig. 2

12
16
152
15
151
6
19
24
25
22
23
18
14
13
28
10
27

FUEL INJECTION VALVE

BACKGROUND OF THE INVENTION

1. Field of the Invention

The invention relates to a fuel injection valve having a piezoceramic valve body, comprising a plurality of superposed ceramic plates each having one conductor layer on each side and voltage leads to the conductor layers.

2. Description of the Prior Art

A fuel injection valve of the said type has been described in the DE-OS No. 24 02 085. Therein adjacent ceramic bodies are provided on both sides with conductor layers and are separated from one another by one insulating layer each. The conductor layers are connected to electrodes. A connection of such conductor layers to electrodes is difficult and complicated.

The DE-OS No. 17 51 543 describes a fuel injection valve, wherein a metallic carrier plate carries ceramic plates. Same are oppositely polarized each; thereby unsymmetries and variations of the setting paths of the valve are caused. Also in this case the voltage connection to the carrier plate is critical.

SUMMARY OF THE INVENTION

An object of the invention is to provide a mechanically stable and durable contacting of the conductor foils in order to achieve a long useful life.

According to the invention this object is solved in that each ceramic plate is arranged on a carrier plate, that between each unit, consisting of a ceramic plate and a carrier plate, an insulating foil is provided with conductor foils arranged on each side as conductor layers, that each insulating foil comprises two terminal lugs, that each insulating foil, in the region of a terminal lug, is laminated on one side with one conductor foil, and that the correlated terminal lugs are connected in each case to an electrical contact for the correlated contact foils.

The invention differs from the prior art in that the conductor foils for the voltage supply to the carrier plate and to the ceramic plate are formed in each case with an insulating foil as compound foil so that the conductor arrangement has a firm coherence. This enables a stable and durable voltage connection. It is possible by this arrangement to operate the individual ceramic plates in equal orientations so that an exact position-dependent control is possible. The terminal lugs of the insulating and conductor foils can be contacted easily and durably.

A secure contacting is reached in that the correlated terminal lugs are folded at their ends with exposed conductor foil and are stacked one upon the other on a contact pin. By this folding it is guaranteed that in each case the conductor foils of adjacent terminal lugs are superposed in immediate electrical contact so that a safe contacting is guaranteed.

A further object of the invention is directed to a compact arrangement of the foils in that each insulation foil with the two conductor layers forms a compound foil.

In order to stabilize the pile of plates it is provided that the pile of plates consisting of carrier plates, ceramic plates, and compound foils be flanked by a metal plate at each side.

The fuel injection valve is further characterized in that the pile of the plates is situated on a valve stem supporting a valve needle and is clamped between a spring and a supporting shoulder of the valve stem, that the pile is positioned on a shoulder of the valve housing and is compressed by means of a pressure spring against this shoulder in the closing direction of the valve needle. This arrangement renders possible an advantageous construction in that the border of the pile of plates is supported within the valve housing and is compressed in the closing direction of the valve needle.

In order to guarantee proper adjustment of the closing pressure and a secure contact feed, it is provided that within the valve housing a supporting plate is arranged, on which, on the one hand, the pressure spring is supported and which, on the other hand, receives the contact pins.

BRIEF DESCRIPTION OF THE DRAWINGS

FIG. 1 is an axial sectional view of a fuel injection valve according to the invention, FIG. 2 is a section along line A—A in FIG. 1.

DESCRIPTION OF THE PREFERRED EMBODIMENT

Figure 3:
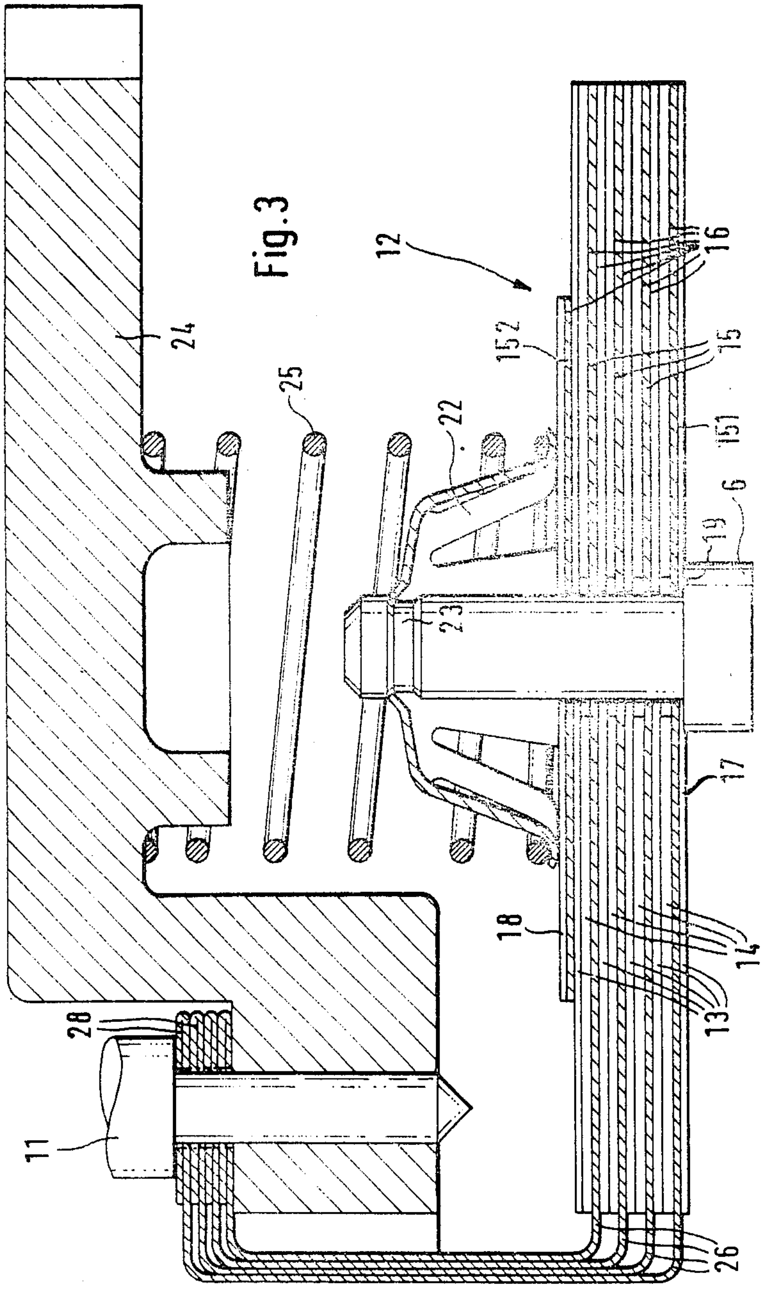
FIG. 3 is a section, drawn to a larger scale, of the plate package, with the terminal lugs of one polarity, whilst

The fuel injection valve comprises a valve housing 1 with a cover 2 and an injection nozzle 3. Within the injection nozzle 3 an injection channel 4 is provided, which is closed by a valve closure 5 situated on a valve stem 6. Within the cover a fuel supply channel 7 as well as a filter body 8 are provided. In addition, a plug-in connection 9 with two contact members or pins 10, 11 is provided.

Within the valve housing the piezoceramic valve body 12 is provided, the structure of which will be described in detail with reference to FIGS. 3 and 4 and which serves as a means for moving the stem 6 with reference to the housing 1. The valve body 12 is built up in the form of a plate package. A plurality of metallic plate-like carriers 13 support each a ceramic plate 14. Each ceramic plate 14 is firmly bonded to the respective carrier 13 in accordance with a conventional method. Between these first laminations including the plates 14 and carriers 13, in each case for the electrical contacting, second laminations in the form of compound foils are arranged, which consist of an insulating foil 15 with metallic conductor foils or layers 16 laminated on both sides. In the inner region of the pile of plates the insulating foils 15 are laminated on both sides in the manner as described. The outermost insulating foils 151 and 152 are laminated just on one side with a conductor foil 16. The pile or stack of first and second laminations is flanked by metal plates 17, 18.

The metal plate 17 is situated, on the one side, on a shoulder or abutment 19 of the valve stem 6 and, on the other side, on a shoulder or abutment 20 of the valve housing 1. In the region of the shoulder 20 channels 21 for the fuel are provided. On the metal plate 18 a first biasing means in the form of a diaphragm spring 22 is supported, which is kept in a groove 23 of the valve stem 6. This spring 22 keeps the plate package, or the valve body 12, respectively, together, in order to guarantee a sufficient electrical contacting between the conductor foils 16 and the carrier plates 13 or the ceramic plates 14, respectively.

Within the valve housing 1 a supporting member in the form of a plate 24 is arranged, on which a second biasing means in the form of a helical pressure spring 25 is supported. This helical pressure spring 25 bears against the diaphragm spring 22 and provides the closing pressure for the valve closure 5 i.e., it urges the closure 5 to its closing position.

Each insulating foil 15, laminated on both sides, comprises two terminal lugs 26, 27. The terminal lugs 26 are laminated, on one side, with the conductor foil 16 of one voltage polarity. According to FIG. 3 this is the positive voltage polarity. The outermost insulating foil 151 comprises just one terminal lug according to the said polarity. The termincal lugs 26 are folded each at the end so that in the region of this folding 28 the conductor foil 16 is situated on the outside. These foldings 28 are superposed and are placed on the contact pin 11 of the corresponding polarity. Thus, in each case conductor foils of adjacent insulating foils are placed one upon the other. Thereby a secure conducting connection is guaranteed. The contact pin 11 is fastened in the supporting plate 24 and fixed.

Figure 4:
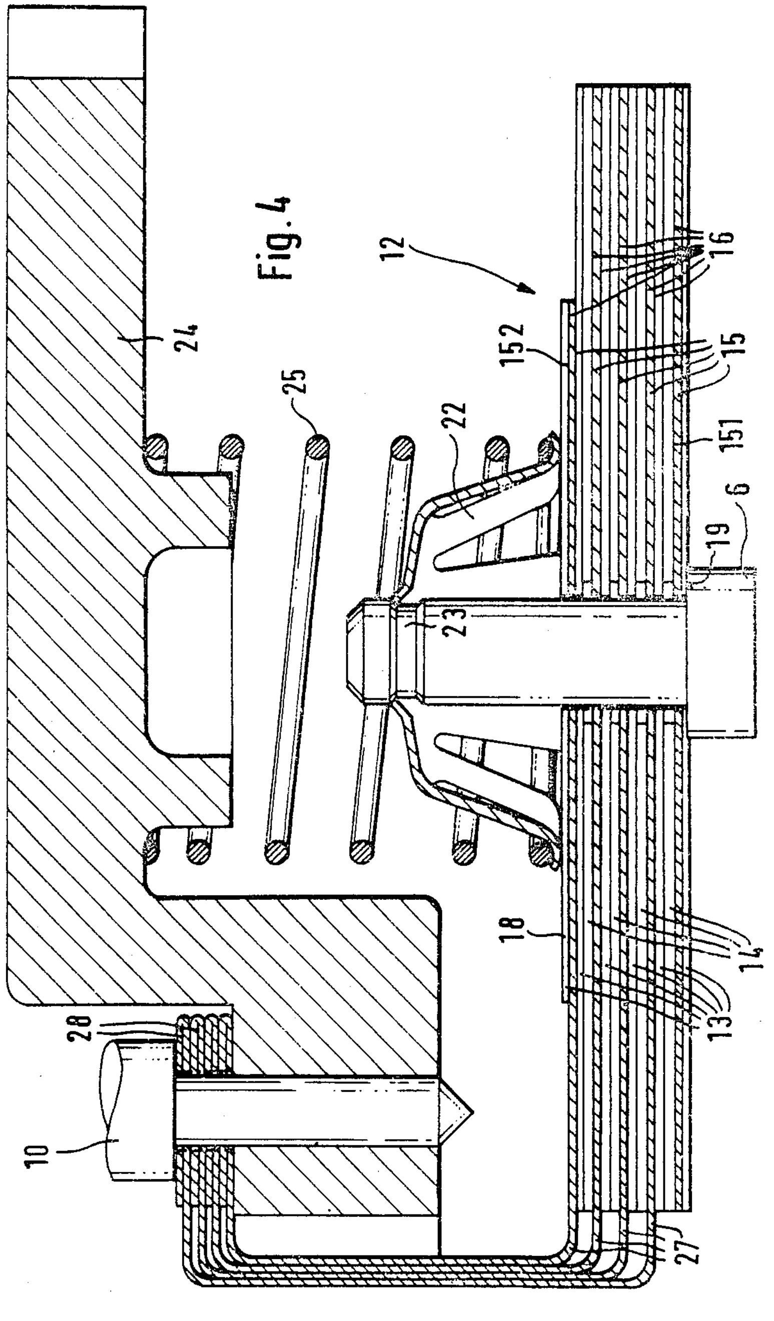
FIG. 4 shows a corresponding section through the plate package, with the terminal lugs of the opposite polarity.

The conductor foils of opposite polarity are led via the terminal lugs 27 to the contact pin 10 as shown in FIG. 4. Also in this case an insulating foil 152 comprises just one terminal lug 27. Also in this case the foldings 28 are provided at the end.

The individual ceramic plates of the pile of plates are electrically connected in parallel so that each ceramic plate supplies a precisely defined amount to the opening force. It is possible to provide by a specific quantity of the ceramic plates every opening force. It is also possible to realize a desired characteristic line by a specific dimensioning of the individual ceramic plates. Thus, an arrangement according to the invention renders possible a practical structure of a fuel injection valve with a piezoceramic valve body. The connecting technique with conductor foils and insulating foils enables assembly without difficulty. In this manner the difficulties of the conventional contacting methods for ceramic plates are avoided.

We claim:

1. A valve, particularly a fuel injection valve, comprising a housing having a channel; a valve stem installed in said channel and movable between a plurality of positions including a closing position; and means for moving said stem, including a pile of laminations comprising a plurality of first laminations each having a ceramic plate and a plate-like carrier for the ceramic plate, a plurality of second laminations alternating with said first laminations and each including an insulating foil and first and second conductor foils flanking the insulating foil, first electric terminal means connected with said first conductor foils, second electric terminal means connected with said second conductor foils, a pair of plates flanking said pile of laminations, a first abutment on said stem for one of said plates, first resilient means reacting against said stem and bearing against the other of said plates to urge said pile against said one plate, a second abutment on said housing for said pile, and second resilient means for biasing said pile against said second abutment to thereby urge said stem to said closing position.

2. The valve of claim 1, wherein said housing includes a supporting member and said second resilient means reacts against said supporting member, and further comprising first and second electric contacts provided on said supporting member and respectively connected with said first and second terminal means.

3. The valve of claim 1, wherein said plates are metallic plates.

4. The valve of claim 1, wherein each second lamination constitutes a compound foil.

5. The valve of claim 1, wherein each of said terminal means comprises a stack of abutting lugs.

* * * * *

UNITED STATES PATENT AND TRADEMARK OFFICE
CERTIFICATE OF CORRECTION

PATENT NO. : 4,739,929

DATED : April 26, 1988

INVENTOR(S) : Burkhard Brandner et al

It is certified that error appears in the above-identified patent and that said Letters Patent is hereby corrected as shown below:

On the title page Insert

--(30) Foreign Application Priority Data
September 13, 1985 Federal Republic Germany 3532660 --.

Signed and Sealed this

Ninth Day of May, 1989

*Attest:*

DONALD J. QUIGG

*Attesting Officer* *Commissioner of Patents and Trademarks*